US010870930B2

(12) United States Patent
Bosman et al.

(10) Patent No.: US 10,870,930 B2
(45) Date of Patent: Dec. 22, 2020

(54) HYBRID CHAIN LINK

(71) Applicant: DSM IP ASSETS B.V., Heerlen (NL)

(72) Inventors: Rigobert Bosman, Echt (NL); Dietrich Wienke, Echt (NL); Roelof Marissen, Echt (NL); Jozef Siegfried Johannes Homminga, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 389 days.

(21) Appl. No.: 15/572,151

(22) PCT Filed: May 27, 2016

(86) PCT No.: PCT/EP2016/061979
§ 371 (c)(1),
(2) Date: Nov. 6, 2017

(87) PCT Pub. No.: WO2016/189119
PCT Pub. Date: Dec. 1, 2016

(65) Prior Publication Data
US 2018/0112336 A1   Apr. 26, 2018

(30) Foreign Application Priority Data
May 28, 2015   (EP) .................................. 15169671

(51) Int. Cl.
*D03D 3/00*   (2006.01)
*F16G 13/12*   (2006.01)
*F16G 15/12*   (2006.01)

(52) U.S. Cl.
CPC ............. *D03D 3/005* (2013.01); *F16G 13/12* (2013.01); *F16G 15/12* (2013.01); *D10B 2401/063* (2013.01)

(58) Field of Classification Search
CPC ......... F16G 13/12; F16G 15/12; D03D 3/005; D10B 2401/063; D10B 2321/0211; D10B 2505/00
USPC ........................................................... 59/78
See application file for complete search history.

(56) References Cited

U.S. PATENT DOCUMENTS

| 3,153,898 | A | * | 10/1964 | Gerhardt | F16G 13/14 59/84 |
| 3,707,021 | A | * | 12/1972 | Norrman | B66C 1/12 24/16 R |
| 3,733,811 | A | * | 5/1973 | Florjancic | F16G 13/14 59/35.1 |
| 4,232,619 | A | * | 11/1980 | Lindahl | B66C 1/12 112/417 |
| 4,384,016 | A |   | 5/1983 | Ide et al. | |
| 4,413,110 | A |   | 11/1983 | Kavesh et al. | |
| 4,779,411 | A | * | 10/1988 | Kendall | F16G 13/12 59/78 |
| 5,091,133 | A |   | 2/1992 | Kobayashi et al. | |
| 5,269,129 | A | * | 12/1993 | Lundy | B63B 21/20 474/207 |
| 7,993,715 | B2 |   | 8/2011 | Geva et al. | |
| 8,468,793 | B2 | * | 6/2013 | Wienke | F16G 13/12 59/78 |
| 9,879,757 | B2 | * | 1/2018 | Wienke | B66C 1/125 |
| 2008/0277952 | A1 | * | 11/2008 | Inkel | B66C 1/18 294/74 |
| 2011/0011051 | A1 | * | 1/2011 | Wienke | F16G 13/12 59/84 |
| 2015/0247554 | A1 | * | 9/2015 | Wienke | D03D 25/005 59/84 |
| 2018/0119776 | A1 | * | 5/2018 | Wienke | D03D 3/005 |
| 2018/0127900 | A1 | * | 5/2018 | Bosman | D03D 3/005 |

FOREIGN PATENT DOCUMENTS

| EP | 0 205 960 | 12/1986 |
| EP | 0 213 208 | 3/1987 |
| EP | 0 269 151 | 6/1988 |
| EP | 0 200 547 | 7/1991 |
| EP | 0 504 954 | 9/1992 |
| EP | 0 472 114 | 4/1999 |
| GB | 2 042 414 | 9/1980 |
| GB | 2 051 667 | 1/1981 |
| WO | WO 01/73173 | 10/2001 |
| WO | WO 2005/066401 | 7/2005 |
| WO | WO 2008/089798 | 7/2008 |
| WO | WO 2009/056286 | 5/2009 |

(Continued)

OTHER PUBLICATIONS

International Search Report for PCT/EP2016/061979 dated Aug. 26, 2016, 2 pages.

(Continued)

*Primary Examiner* — Teresa M Ekiert
(74) *Attorney, Agent, or Firm* — Nixon & Vanderhye P.C.

(57) ABSTRACT

The present invention relates to a chain link comprising a strip comprising a longitudinal core section and at least two longitudinal edge sections, wherein the thickness of the core section is higher than the thickness of the edge sections, preferably the strip comprising warp yarn A and warp yarn B, the titer of warp yarn A being higher than the titer of warp yarn B, and wherein the concentration of warp yarn A in the core section is higher than the concentration of yarn A in the edge sections of the strip and the concentration of warp yarn B in the edge sections is higher than the concentration of warp yarn B in the core section of the strip. The invention also relates to a chain comprising said chain link and to the use of said chain in different applications.

27 Claims, No Drawings

(56) References Cited

FOREIGN PATENT DOCUMENTS

| | | |
|---|---|---|
| WO | WO 2009/115249 | 9/2009 |
| WO | WO 2012/139934 | 10/2012 |
| WO | WO 2013/186206 | 12/2013 |
| WO | WO 2015/086627 | 6/2015 |
| WO | WO 2016/001158 | 1/2016 |

OTHER PUBLICATIONS

H. N. A. M. Steenbakkers-Menting, "Chlorination of ultrahigh molecular weight polyethylene", PhD Thesis, technical University of Eindhoven, The Netherlands (1995), 152 pages.

* cited by examiner

HYBRID CHAIN LINK

This application is the U.S. national phase of International Application No. PCT/EP2016/061979 filed May 27, 2016 which designated the U.S. and claims priority to EP Patent Application No. 15169671.3 filed May 28, 2015, the entire contents of each of which are hereby incorporated by reference.

The present invention relates to a chain link comprising a strip comprising at least two different warp yarns. The invention also directs to a chain comprising said chain link. Furthermore, the invention relates to the use of said chain in certain applications.

Such a chain link is already known from prior art. For instance, document WO2008089798 discloses chain links comprising strips comprising polyolefin multifilament yarns, particularly ultrahigh molecular weight polyethylene (UHMWPE) multifilament yarns. Document WO2009/115249A1 discloses first chain links comprising polymeric multifilament yarns and having a thickness $\tau_1$ at least at the portion where they interconnect with adjacent chain links, the adjacent links have a thickness $\tau_2$ at least at the portion where they interconnect with the first links and wherein the ratio $\tau_2/\tau_1$ is at least 1.2. The chain disclosed in WO2009/115249A1 can be made of alternating rigid and flexible links made of different materials, thicknesses and weights and having approximately equal strength.

Although the chains described in the above-mentioned documents represent improvements in the state of the art, there is a continuous need for further improving synthetic chains. The efficiency of the chains disclosed in the prior art is lower because the stress distribution between two adjacent chain links is rather non-homogeneous, this causing damage or fracture of the chain links at lower loads applied on the chain than expected or desired. In addition, the known hybrid chain constructions typically result in additional weight to the chain. Moreover, by using the chain links of prior art having different types of materials, with different thicknesses and weights, chains are produced at high costs, by complex methods and poses a danger risk to safety because the chain links show different aging (e.g. degradation and corrosion) behavior.

The object of the invention is therefore to provide a chain with improved efficiency with respect to the amount of yarn used, which reduces losses in strength while managing maximum load transfer between adjacent chain links.

This objective was achieved with a chain link comprising a strip comprising a longitudinal core section and at least two longitudinal edge sections, wherein the thickness of the core section is higher than the thickness of the edge sections.

Surprisingly, it was found that, by employing the chain link according to the present invention in a chain construction, an increase of the breaking strength and efficiency of the chain were obtained. In addition, significant less loss of utilized fiber strength results in a lower cost per strength unit of the chain.

Additional advantages of the chain link according to the present invention include lighter weight and higher safety factor, i.e. is less prone to fail or break when subjected to high loads.

By "fiber" is herein understood an elongated body having a length, a width and a thickness, with the length dimension of said body being much greater than the transverse dimensions of width and thickness. The fibers may have continuous lengths, known in the art as filaments, or discontinuous lengths, known in the art as staple fibers. The fibers may have various cross-sections, e.g. regular or irregular cross-sections with a circular, bean-shape, oval or rectangular shape and they can be twisted or non-twisted.

By "yarn" is herein understood an elongated body containing a plurality of fibers or filaments, i.e. at least two individual fibers or filaments. By individual fiber or filament is herein understood the fiber or filament as such. The term "yarn" includes continuous filament yarns or filament yarns which contain a plurality of continuous filament fibers and staple yarns or spun yarns containing short fibers also called staple fibers. Such yarns are known to the skilled person in the art.

By "strip" is meant herein an elongated body having a thickness (t) and a width (w), wherein thickness (t) is much smaller than width (w). Particularly, by "strip" is meant herein an elongated body having a core section and longitudinal edge sections and having a maximum thickness ($t_{max}$) in the center of the core section, a minimum thickness ($t_{min}$) at the longitudinal edge sections and a width (w), wherein both thicknesses are smaller than width (w). Such strips are preferably flexible bodies, particularly fabrics or woven structures such as a plain and/or twill weave construction for instance, known in the art as also narrow weave or textile webbing. The strip may have regular or irregular cross-sections. The strip may alternatively be a tape or a hollow circular textile tube or sleeve. The "strip" may be also referred to herein as webbing or narrow weave or woven structure.

By "warp yarn" is generally understood a multitude of yarns having the different or similar composition, and may be also referred to as warp system. Each warp yarn runs substantially lengthwise, in the machine direction of the strip. In general, the length direction is only limited by the length of the warp yarns whereas the width of a strip is mainly limited by the number of the individual warp yarns (also referred herein to as number of pitches) and the width of the weaving machine employed.

The "weft yarn" term generally refers to the yarns that run in a cross-wise direction, transverse to the machine direction of the strip. Defined by a weaving sequence of the strip, the weft yarn repeatedly interlaces or interconnects with said at least one warp yarn. The angle formed between the warp yarns and the weft yarns is preferably about 90°. The strip may comprise one single weft yarn or multiple weft yarns with similar or different composition. The weft yarn in the strip according to the present invention can be one single weft yarn or a plurality of weft yarns.

By "selvedge" (or selvage) is meant herein the woven outmost edge of a strip or webbing or narrow structure, particularly an edge of a strip or webbing or narrow structure wherein the yarns that run in a direction perpendicular to the edge of the strip are not extending from the strip as free ends, but are continuous at the edge by returning into the strip. Selvedges are typically formed in fill (also called weft) yarns during a shuttle weaving process, but may also be made with other techniques or in warp yarns.

The higher thickness of the core section than the thickness of the at least two longitudinal edge sections in the strip of the chain link according to the present invention may be achieved by any method known in the art, including by using warp yarns in the edge sections of the strip having different titers as described herein below or by folding the strip in at least one, preferably in at least two folds along its longitudinal axis and preferably then applying stitches to keep the folds fixed in place. The thickness of the strip sections can be also referred herein as areal density ($kg/m^2$).

Preferably, the chain link according to the present invention comprises a strip comprising a longitudinal core section and at least two longitudinal edge sections, the thickness of the core section being higher than the thickness of the edge sections, wherein the strip comprises warp yarns containing warp yarn A and warp yarn B, wherein the titer of warp yarn A is higher than the titer of warp yarn B and the concentration of warp yarn A in the core section is higher than the concentration of yarn A in the longitudinal edge sections of the strip and the concentration of warp yarn B in the edge sections is higher than the concentration of warp yarn B in the core section of the strip. Preferably, there are two longitudinal edge sections.

The strip may comprise a plurality of warp yarns comprising or consisting of warp yarns A and B and typically of a plurality of weft yarns. The amount of weft yarns is preferably lower than the amount of warp yarns in the strip as the warp yarns are typically carrying the load in a chain construction. The amount of weft yarns may be less than 50 wt %, based on the total weight of the strip, preferably at most 45 wt %, at most 30 wt %, at most 20 wt %, at most 10 wt % or at most 5 wt %, based on the total weight of the strip.

Preferably, the weft yarns and/or the warp yarns in the strip of the chain link according to the present invention comprise any polymer and/or polymer composition that can be processed into a high performance yarn. More preferably, the strip in the chain link according to the present invention comprises high performance yarns.

In the context of the present invention, "high performance yarns" or "high performance fibers" include yarns or fibers comprising a polymer selected from a group comprising or consisting of homopolymers and/or copolymers of alpha-olefins, e.g. ethylene and/or propylene; polyoxymethylene; poly(vinylidine fluoride); poly(methylpentene); poly(ethylene-chlorotrifluoroethylene); polyamides and polyaramides, e.g. poly(p-phenylene terephthalamide) (known as Kevler®); polyarylates; poly(tetrafluoroethylene) (PTFE); poly{2,6-diimidazo-[4,5b-4',5'e]pyridinylene-1,4(2,5-dihydroxy)phenylene} (known as M5); poly(p-phenylene-2, 6-benzobisoxazole) (PBO) (known as Zylon®); poly(hexamethyleneadipamide) (known as nylon 6,6); polybutene; polyesters, e.g. poly(ethylene terephthalate), poly(butylene terephthalate), and poly(1,4 cyclohexylidene dimethylene terephthalate); polyacrylonitriles; polyvinyl alcohols and thermotropic liquid crystal polymers (LCP) as known from e.g. U.S. Pat. No. 4,384,016, e.g. Vectran® (copolymers of para hydroxybenzoic acid and para hydroxynaphtalic acid). Also warp yarns and/or weft yarns comprising carbon nanotubes are possible. Also combinations of yarns comprising said polymers can be comprised in each warp yarn A and B and used for manufacturing the strip in the chain link according to the present invention. More preferably, the chain link according to the present invention comprises warp yarns A and B, wherein each yarn A and B comprise polyolefins, preferably alpha-polyolefins, such as propylene and/or ethylene homopolymers and/or propylene and/or ethylene based copolymers. The average molecular weight ($M_w$) and/or the intrinsic viscosity (IV) of said polymeric materials can be easily selected by the skilled person in order to obtain a fiber having desired mechanical properties, e.g. tensile strength. The technical literature provides further guidance not only to which values for $M_w$ or IV a skilled person should use in order to obtain strong fibers, i.e. fibers with a high tensile strength, but also to how to produce such fibers.

Alternatively, high performance yarns may be understood herein to include yarns, preferably polymeric yarns, having a tenacity or tensile strength of at least 1.2 N/tex, more preferably at least 2.5 N/tex, most preferably at least 3.5 N/tex, yet most preferably at least 4 N/tex. For practical reasons, the tenacity or tensile strength of the high performance yarns may be at most 10 N/tex. The tensile strength may be measured by the method as described in the "Examples" section herein below.

The tensile modulus of the high performance yarns may be of at least 40 GPa, more preferably at least 60 GPa, most preferably at least 80 GPa. The titer of the fibers in said yarn is preferably at least 100 dtex, even more preferably at least 1000 dtex, yet even more preferably at least 2000 dtex, yet even more preferably at least 3000 dtex, yet even more preferably at least 5000 dtex, yet even more preferably at least 7000 dtex, most preferably at least 10000 dtex.

Preferably, the warp yarns A and B and/or the weft yarns comprise high performance yarns comprising a polymer, yet more preferably a polyolefin, yet more preferably a polyethylene and most preferably ultrahigh molecular weight polyethylene (UHMWPE). The warp yarns A and B and/or the weft yarns may substantially consist of a polymer, preferably a polyolefin, more preferably a high performance polyethylene and most preferably ultrahigh molecular weight polyethylene (UHMWPE). In a chain, forces are typically transmitted from one chain link to another through the interconnections, where links make direct local mutual contact. At the contact points or locations the chain links are generally highly stressed (mainly compressive stresses), which easily leads to local damage or even fracture of the link. When using polyolefins and especially UHMWPE in the yarns, the service life and reliability of the chain is improved, in particular under dynamic loading conditions.

In the context of the present invention, the expression 'substantially consisting of' has the meaning of 'may comprise traces of further species' or in other words 'comprising more than 98 wt % of' and hence allows for the presence of up to 2 wt % of further species.

By 'UHMWPE' is understood to be a polyethylene having an intrinsic viscosity (IV), as measured on solution in decalin at 135° C.) of at least 5 dl/g, preferably of between about 8 and 40 dl/g. Intrinsic viscosity is a measure for molar mass (also called molecular weight) that can more easily be determined than actual molar mass parameters like Mn and Mw. There are several empirical relations between IV and Mw, but such relation is dependent on molar mass distribution. Based on the equation Mw=5.37*10$^4$ [IV]$^{1.37}$ (see EP 0504954 A1) an IV of 8 dl/g would be equivalent to Mw of about 930 kg/mol. Preferably, the UHMWPE is a linear polyethylene with less than one branch per 100 carbon atoms, and preferably less than one branch per 300 carbon atoms; a branch or side chain or chain branch usually containing at least 10 carbon atoms. The linear polyethylene may further contain up to 5 mol % of one or more comonomers, such as alkenes like propylene, butene, pentene, 4-methylpentene or octene.

By 'UHMWPE yarns' are herein understood to be yarns comprising fibers comprising ultra-high molar mass polyethylene and having a tenacity of at least 1.5, preferably 2.0, more preferably at least 2.5 or at least 3.0 N/tex. Tensile strength, also simply strength, or tenacity of fibers are determined by known methods as described in the experimental section. There is no reason for an upper limit of tenacity of UHMWPE fibres in the rope, but available fibres typically are of tenacity at most about 5 to 6 N/tex. The UHMWPE fibres also have a high tensile modulus, e.g. of at least 75 N/tex, preferably at least 100 or at least 125 N/tex. UHMWPE fibres are also referred to as high-modulus polyethylene fibres or high performance polyethylene fibers.

The UHMWPE yarns preferably have a titer of at least 5 dtex, more preferably at least 10 dtex. For practical reasons, the titer of the yarns of the invention are at most several thousand dtex, preferably at most 5000 dtex, more preferably at most 3000 dtex. Preferably the titer of the yarns is in the range of 10 to 10000, more preferably 15 to 6000 and most preferably in the range from 20 to 3000 dtex.

The UHMWPE fibres preferably have a filament titer of at least 0.1 dtex, more preferably at least 0.5 dtex, most preferably at least 0.8 dtex. The maximum filament titer is preferably at most 50 dtex, more preferably at most 30 dtex and most preferably at most 20 dtex.

Preferably, the UHMWPE yarns comprise gel-spun fibers, i.e. fibers manufactured with a gel-spinning process. Examples of gel spinning processes for the manufacturing of UHMWPE fibers are described in numerous publications, including EP 0205960 A, EP 0213208 A1, U.S. Pat. No. 4,413,110, GB 2042414 A, GB-A-2051667, EP 0200547 B1, EP 0472114 B1, WO 01/73173 A1 and EP 1,699,954. The gel spinning process typically comprises preparing a solution of a polymer of high intrinsic viscosity (e.g. UHMWPE), extruding the solution into fibers at a temperature above the dissolving temperature, cooling down the fibers below the gelling temperature, thereby at least partly gelling the fibers, and drawing the fibers before, during and/or after at least partial removal of the solvent. The gel-spun fibers obtained may contain very low amount of solvent, for instance at most 500 ppm.

The strip may further contain any customary additives, in an amount of for instance between 0 and 30 wt %, preferably between 5 and 20 wt % from the total weight strip composition. The weft yarns and/or the warp yarns may be coated by e.g. coatings to reduce or improve adhesion—depending on the desired property, colorants, solvents, anti-oxidants, thermal stabilizers, flow promoters and the like. Said yarns may be coated, preferably with 10 to 20 wt % polyurethane, particularly a water dispersed polyurethane coating, to hold the fibers together in the yarn. Other suitable coatings may include silicone, polyester and reactive based coatings.

Preferably, the warp yarns A and B comprise high performance yarns according to the definition of the high performance yarns as refer to herein. Preferably, the wrap yarns A and B comprise at least 10 wt % high performance yarns based on the total warp yarns weight composition, more preferably at least 25 wt %, even more preferably at least 50 wt %, even more preferably at least 75 wt %, even more preferably at least 90 wt % and most preferably 100 wt % of high performance yarns. More preferably, the high performance yarns comprise a polyethylene and most preferably, UHMWPE.

The weft yarns in the strip of the chain link of the present invention preferably comprise high performance yarns according to the definition of the high performance yarns as refer to herein. In a more preferred embodiment, the weft yarn(s) comprises at least 10 wt % high performance yarns based on the total weft yarn weight composition, more preferably at least 25 wt %, even more preferably at least 50 wt %, even more preferably at least 75 wt %, even more preferably at least 90 wt % and most preferably 100 wt % of high performance yarns. More preferably, the high performance yarns comprise a high performance polyethylene and most preferably, UHMWPE.

Preferably, the titer of the warp yarn A is in a range of from 10 dtex to 1000000 dtex, preferably in the range of from 100 dtex to 100000 dtex and yet more preferably in the range of from 1000 dtex to 10000 dtex, most preferably in the range of from 1500 dtex to 7000 dtex and yet most preferably in the range of from 2000 dtex to 5000 dtex and yet most preferably in the range of from 2000 dtex to 3000 dtex.

Preferably, the titer of the warp yarn B is in the range between 5 dtex and 500.000 dtex, yet preferably in the range between 50 dtex and 250000 dtex, more preferably in the range of from 200 dtex to 10000 dtex, yet more preferably in the range of from 500 dtex to 7000 dtex, yet more preferably in the range of from 700 to 7500 and most preferably, in the range between 800 dtex and 3000 dtex.

Without being bound to any theory, it is believed that by employing the strip in the construction of the chain link according to the present invention, the contact surface between adjacent interconnected chain links changes and the forces distribute more equally at each point into each direction of the chain link, minimizing local peak stress. This may lead to the formation of an optimum saddle between the interconnected adjacent chain links allowing maximum load transfer between said links and resulting in an increase of the breaking strength and efficiency of the chain. An optimum saddle may be characterized by a large contact surface and about equal force distribution across all directions at any point in the chain link, this resulting in optimum load transfer between adjacent chain links.

With respect to its location towards the adjacent link, each edge section of the strip may have an outer and an inner side. The outer edge section side is the part facing the outside/exterior of the strip (e.g. the adjacent chain link). The inner edge section side is the part of the edge facing the core of the strip and is opposite to the outer edge. Both inner edge sides are adjacent to the core section. Both outer edge sides are facing outside (e.g. the adjacent chain link). It goes without saying that although called "inner" section and "outer" section, these denominations are not limiting and they are interchangeable. The core of the strip is herein the longitudinal section of the strip located between the two longitudinal edge sections and is adjacent to both inner longitudinal edge sections. Each longitudinal edge can comprise or consist of a selvedge.

With respect to its location towards the outside and/or towards another strip, each edge section of one strip may typically have an upper surface (herein may also be referred to as "upper side") and a lower surface (herein may also be referred to as "lower side") opposite to the upper surface. It goes without saying that although called upper surface and lower surface, these denominations are not limiting and they may be interchangeable.

The weight ratio of yarn A to yarn B (A/B) in the strip in the chain link according to the present invention may be $0.1 \leq A/B \leq 10$. Preferably, the ratio A/B is $0.5 \leq A/B \leq 5$. More preferably, the ratio A/B is about $0.7 \leq A/B \leq 3$, yet more preferably, said ratio is $1 \leq A/B \leq 2$. By applying such weight ratios, the breaking strength and efficiency of the chain increase.

The concentration of warp yarn A in the edge sections is preferably in a range of from 0 wt % to 50 wt %, based on the total warp yarns weight in each longitudinal edge section, or at least 40 wt %, or at least 30 wt %, or at least 20 wt %, or at least 10 wt %, based on the total warp yarn weight in each longitudinal edge section.

The concentration of warp yarn B in each longitudinal edge sections is preferably in a range of from 100 wt % to 50 wt %, based on the total warp yarn weight in each longitudinal edge section, preferably in a range of from 100 to 85 wt % and most preferably about 100 wt %. The concentration of warp yarn B in each longitudinal edge section is preferably at least 60 wt %, more preferably at least 70 wt %, yet more preferably at least 80 wt %, yet more preferably at least 90 wt % and most preferably at least 95 wt % based on the total warp yarn weight in each longitudinal edge section.

The concentration of warp yarn A in the core section is preferably in a range of from 100 wt % to 50 wt %, based on the total warp yarn weight in the core section, preferably at most 95 wt % and at least 75 wt %. preferably between 100 and 85 wt % and most preferably about 100 wt %. The concentration of warp yarn A in the core section is preferably at least 60 wt %, more preferably at least 70 wt %, yet more preferably at least 80 wt %, yet more preferably at least 90 wt % and most preferably at least 95 wt %, based on the total warp yarn weight in the core section.

The concentration of warp yarn B in the core section is preferably in a range of from 0 wt % to 50 wt %, based on the total warp yarn weight in each longitudinal edge section, or at least 40 wt %, or at least 30 wt %, or at least 20 wt %, or at least 10 wt %, based on the total warp yarn weight in each longitudinal edge section.

The total weight of the warp yarns in the core section sums up to 100 wt %. The total weight of the warp yarns in each edge section sums up to 100 wt. %. The total weight of the warp yarns and the weft yarns in the strip of the invention sums up to 100 wt %.

The concentration of the warp yarn A and of the warp yarn B may vary as a gradient across the width of the strip, each longitudinal edge section contains preferably at most or even about 100 wt % warp yarn B and the core section contains preferably at most or even about 100 wt % warp yarn A. The strip in the chain link according to the present invention may have a thicker (e.g. with higher titer) cross-section profile in its core section (e.g. containing yarns with higher titers, such as yarn A) while gradually reducing its thickness (e.g. by reducing the titer) across the core section and the edge sections towards the longitudinal edge sections (e.g. containing yarns with lower titers, such as yarns B and optionally C). This may result in a approximately lens shape thickness profile or flat stair alike profile or nearly elliptic approximation of cross-section profile of the, also referred to herein as "substantially elliptic cross-section" of the strip.

The strip of the invention may further comprise a warp yarn C in the longitudinal edge sections, wherein the titer of warp yarn A is higher than the titer of warp yarn B and the titer of warp yarn B is higher than the titer of warp yarn C, wherein the concentration of individual warp yarns B and C in the longitudinal edge sections is higher than the concentration of individual warp yarns B and C in the core section of the strip. The warp yarn C may be located at the outmost longitudinal edge section of the stripe (e.g. towards the exterior of the stripe, adjacent to warp yarn B and together with warp yarn B in the longitudinal edge sections or in other words between the exterior of the stripe and the warp yarn B).

Preferably, the titer of warp yarn C is in a range of from 1 dtex to 100000 dtex, yet preferably in a range of from 50 dtex to 10000 dtex, yet preferably in a range between 220 dtex and 50000 dtex, more preferably in the range of from 200 dtex to 10000 dtex, yet more preferably in the range of from 500 dtex to 7500 dtex, yet more preferably in the range of from 700 to 7500 and most preferably, in the range between 900 dtex and 3000 dtex and yet most preferably in the range between 800 dtex and 2000 dtex.

The weight ratio of yarn B to yarn C (B/C) in the strip in the chain link according to the present invention may be $0.1 \leq B/C \leq 10$. Preferably, the ratio B/C is $0.5 \leq B/C \leq 5$. More preferably, the ratio B/C is about $0.7 \leq B/C \leq 3$, yet more preferably, said ratio is $1 \leq B/C \leq 2$.

The concentration of warp yarn C may vary in the edge sections between 0 wt % to 50 wt %, based on the total warp yarn weight composition of the edge sections, preferably between 20% and 50 wt %. The concentration of warp yarn C in the longitudinal edge sections is more preferably, at most 50 wt %, or at most 40 wt %, at most 30 wt %, at most 20 wt %, at most 10 wt %, at most 5 wt % or at most 0.5 wt %, based on the total warp yarn weight composition of one edge section.

The strip according to the present invention may contain additional warp yarns D, wherein the titer of warp yarn A is higher than the titer of warp yarn B and the titer of warp yarn B is higher than the titer of warp yarn C, and the titer of warp yarn C is higher than the titer of additional warp yarns wherein the concentration of warp yarns B and/or C and/or additional warp yarns D in the longitudinal edge sections is higher than the concentration of warp yarns B and/or C and/or additional warp yarns D in the core section of the strip. The additional warp yarns D may be located at the outmost longitudinal edge section of the stripe (e.g. towards the exterior of the stripe, adjacent to warp yarn C or, in other words, between the exterior of the stripe and the warp yarn C).

The strip of the invention comprises warp yarns, including warp yarn A and warp yarn B, which are distinguished by their titers and may be distinguished also by their position within the strip. Such position within the strip can be achieved by techniques commonly known in the field. By the position of the warp yarns within the strip is herein understood the respective position of warp yarn A and warp yarn B in relation through the width of the strip. The position of the two warp yarns may be defined according to their position across the width of the strip. In this respect, a strip can be considered to be a three dimensional object wherein one dimension (the thickness) is much smaller than the two other dimensions (the length or the warp direction and the width or weft direction). In general, the length direction is only limited by the length of the warp yarns whereas the width of a strip is mainly limited by the count of individual warp yarns and the width of the weaving machine employed.

The weave or webbing structure formed by the warp yarns and the weft yarns can be of multiple types, depending upon the number and diameters of the employed warp yarns and weft yarns as well as on the weaving sequence used between the warp yarns and the weft yarns during the weaving process. Such different sequences are well known to the person skilled in the art. Through the known weaving processes the weft yarn interweaves the warp yarns. Such interweaved structure may also be called a monolayer strip.

The warp yarns system in the strip of the chain link according to the present invention may comprise warp yarns having similar or different characteristics, such as minimum creep rates and/or specific weight and/or elongation and/or density, differences which additionally may favor optimum saddle formation and stress reduced maximum load transfer between adjacent chain links. The core section of the strip may comprise warp yarns, such as warp yarns A that have a minimum creep rate that is lower than of the warp yarns comprised in the longitudinal edge sections, minimum creep rate being measured at a tension of 900 MPa and a temperature of 30° C. Preferably, the warp yarns with lower minimum creep rate comprise a polyethylene, preferably a high performance polyethylene, most preferably of UHMWPE and even most preferably UHMWPE comprising olefinic branches (OB). More preferably, the warp yarns with lower minimum creep rate comprises UHMWPE comprising olefinic branches. Most preferably, the warp yarn with lower minimum creep rate in the strip according to the present invention, substantially consists of a polyethylene, preferably a high performance polyethylene, most preferably of UHMWPE and even most preferably UHMWPE comprising olefinic branches (OB). Such a UHMWPE is for instance described in document WO2012139934, included herein by reference. The OB may have a number of carbon atoms between 1 and 20, more preferably between 2 and 16, even more preferably between 2 and 10 and most preferably between 2 and 6. Good results in terms of fiber drawability and stabilizing creep are obtained when said branches are preferably alkyl branches, more preferably ethyl branches, propyl branches, butyl branches or hexyl branches and most preferably ethyl or butyl branches. The number of olefinic, e.g. ethyl or butyl, branches per thousand carbon atoms can be determined by FTIR on a 2 mm thick compression moulded film by quantifying the absorption at 1375 cm$^{-1}$ using a calibration curve based on NMR measurements as in e.g. EP 0 269 151 (in particular page 4 thereof). The UHMWPE also has preferably an amount of olefinic branches per thousand carbon atoms (OB/10000) of between 0.01, more preferably 0.05 and 1.30, more preferably between 0.10 and 1.10, even more preferably between 0.30 and 1.05. When the UHMWPE used according to the invention has ethyl branches, preferably said UHMWPE has an amount of ethyl branches per thousand carbon atoms (C2H5/10000) of between 0.40 and 1.10, more preferably between 0.60 and 1.10, also more preferably between 0.64 and 0.72 or between 0.65 and 0.70 and most preferably between 0.78 and 1.10, also most preferably between 0.90 and 1.08, or between 1.02 and 1.07. When the UHMWPE used according to the invention has butyl branches, preferably said UHMWPE has an amount of butyl branches per thousand carbon atoms (C4H9/1000C) of between 0.05 and 0.80, more preferably between 0.10 and 0.60, even more preferably between 0.15 and 0.55, most preferably between 0.30 and 0.55. Preferably, the yarns comprising UHMWPE comprising olefinic branches are obtained by spinning an UHMWPE comprising olefinic branches and having an elongational stress (ES), and a ratio (OB/1000C)/ES between the number of olefinic branches per thousand carbon atoms (OB/1000C) and elongational stress (ES) of at least 0.2 and more preferably of at least 0.5. Said ratio can be measured wherein said UHMWPE fiber is subjected to a load of 600 MPa at a temperature of 70° C., has a creep lifetime of at least 90 hours, preferably of at least 100 hours, more preferably of between 110 hours and 445 hours, preferably at least 110 hours, even more preferably of at least 120 hours, most preferably of at least 125 hours. The elongational stress (ES in N/mm$^2$) of an UHMWPE can be measured according to ISO 11542-2A. The UHMWPE has preferably a ratio (OB/1000C)/ES of at least 0.3, more preferably of at least 0.4, even more preferably of at least 0.5, yet even more preferably of at least 0.7, yet even more preferably of at least 1.0, yet even more preferably of at least 1.2. When the UHMWPE used in the present invention has ethyl branches, said UHMWPE preferably has a ratio (C2H5/1000C)/ES of at least 1.00, more preferably of at least 1.30, even more preferably of at least 1.45, yet even more preferably of at least 1.50, most preferably of at least 2.00. Preferably said ratio is between 1.00 and 3.00, more preferably between 1.20 and 2.80, even more preferably between 1.40 and 1.60, yet even more preferably between 1.45 and 2.20. When the UHMWPE has butyl branches, said UHMWPE preferably has a ratio (C4H9/1000C)/ES of at least 0.25, even more preferably at least 0.30, yet even more preferably at least 0.40, yet even more preferably at least 0.70, more preferably of at least 1.00, most preferably of at least 1.20. Preferably said ratio is between 0.20 and 3.00, more preferably between 0.40 and 2.00, even more preferably between 1.40 and 1.80. The UHMWPE has preferably an ES of at most 0.70, more preferably of at most 0.50, more preferably of at most 0.49, even more preferably at most 0.45, most preferably at most 0.40. When said UHMWPE has ethyl branches, preferably said UHMWPE has an ES of between 0.30 and 0.70, more preferably between 0.35 and 0.50. When said UHMWPE has butyl branches, preferably said UHMWPE has an ES of between 0.30 and 0.50, more preferably between 0.40 and 0.45. The branched UHMWPE fiber may be obtained by gel-spinning an UHMWPE comprising ethyl branches and having an elongational stress (ES), wherein the ratio (C2H5/10000)/ES between the number of ethyl branches per thousand carbon atoms (C2H5/10000) and the elongational stress (ES) is at least 1.0, wherein C2H5/10000 is between 0.60 and 0.80 or between 0.90 and 1.10 and wherein the ES is between 0.30 and 0.50. Preferably, the UHMWPE has an IV of at least 15 dl/g, more preferably at least 20 dl/g, more preferably at least 25 dl/g. Preferably, the UHMWPE fiber has a creep lifetime of at least 90 hours, preferably of at least 150 hours, more preferably of at least 200 hours, even more preferably of at least 250 hours, most preferably of at least 290 hours and also most preferably of at least 350 hours. The branched UHMWPE fiber may also be obtained by gel-spinning an UHMWPE comprising butyl branches and having an elongational stress (ES), wherein the ratio (C4H9/1000C)ES between the number of butyl branches per thousand carbon atoms (C4H9/10000) and the elongational stress (ES) is at least 0.5, wherein C4H9/10000 is between 0.20 and 0.80 and wherein the ES is between 0.30 and 0.50. Preferably, the UHMWPE has an IV of at least 15 dl/g, more preferably at least 20 dl/g. Preferably, the fiber has a creep lifetime of at least 90 hours, more preferably of at least 200 hours, even more preferably of at least 300 hours, yet even more preferably of at least 400 hours, most preferably of at least 500 hours. The polyolefin, preferably polyethylene and most preferably branched UHMWPE that is preferably used in warp yarn A in the strip in the chain link according to the present invention may be obtained by any process known in the art. The polyolefin preferably comprised in warp yarn A may also or alternatively comprise chlorine side groups on the main polymer chain. Such fibers may be obtained by any methods already known in the art, e.g. by chlorination of a polyolefin, preferably polyethylene and most preferably UHMWPE. Such chlorination methods are described for instance in the published dissertation thesis H. N. A. M. Steenbakkers-Menting, "*Chlorination of ultrahigh molecular weight polyethylene*", PhD Thesis, technical University of Eindhoven, The Netherlands (1995), document incorporated herein by reference. This document describes, for instance, chlorination of PE powder in suspension at 20-40° C.; in a rotating drum at 90° C. and in solution. Fibers comprising polyethylenes, e.g. HDPE and UHMWPE having variable amounts of chlorine groups are described in this document.

The ratio of the minimum creep rate of the warp yarn with higher minimum creep rate to the warp yarn with the lower minimum creep rate and preferably the ratio of the minimum creep rate of warp yarn B to the minimum creep rate of warp yarn A may be at least 2, the minimum creep rate being measured at measured at a tension of 900 MPa and a temperature of 30° C., wherein the concentration of warp yarn A in the core section is higher than the concentration of yarn A in the edge sections of the strip and the concentration of warp yarn B in the edge sections is higher than the concentration of warp yarn B in the core section of the strip and wherein the warp yarn B comprises a high performance yarn, the high performance yarn preferably comprising a polyethylene and more preferably ultrahigh molecular weight polyethylene (UHMWPE), as described herein and the warp yarn A comprises a high performance yarn comprising a polyethylene comprising polyolefin branches, preferably UHMWPE comprising olefinic branches (OB), as described herein. Lower ratio of the minimum creep rate of yarn B to the minimum creep rate of yarn A may have a negligible effect or even decrease the efficiency of the chain. More preferably, the ratio of the minimum creep rate of yarn B to the minimum creep rate of yarn A is at least 5, at least 10, at least 50, at least 100 or more. The minimum creep rate of yarn A can be at most $1 \times 10^{-5}$% per second, said minimum creep rate being measured at a tension of 900 MPa and a temperature of 30° C. Preferably, the warp yarn A in the strip of the chain link of the present invention also have a minimum creep rate of at most $4 \times 10^{-6}$% per second, most preferably at most $2 \times 10^{-6}$% per second, measured at a tension of 900 MPa and a temperature of 30° C. Most preferably, the minimum creep rate of the warp yarn A is at least about $1 \times 10^{-10}$% per second.

Creep is a parameter already known in the art and it typically depends on the tension and the temperature applied on a material. High tension and high temperature values typically promote fast creep behavior. The creep may be (partially) reversible or irreversible on unloading. The rate of time dependent deformation is called creep rate and is a measure of how fast the fibers are undergoing said deformation. The initial creep rate may be high but the creep deformation may decrease during constant loading to a final creep rate that may be negligible (e.g. close to zero value).

The minimum creep rate of the warp yarns in the strip of the chain link according to the present invention may be measured by the method as described in the Examples—Methods of characterization section of the present invention and in the published patent application WO2016001158. Particularity, the minimum creep rate of the warp yarns have been derived herein from a creep measurement applied on multifilament yarns by applying ASTM D885M standard method under a constant load of 900 MPa, at a temperature of 30° C. and then measuring the creep response (i.e. strain elongation, %) as a function of time. The minimum creep rate is herein determined by the first derivative of creep as function of time, at which this first derivative has the lowest value (e.g. the creep rate [1/s] of the yarn is plotted as function of strain elongation [%] of the yarn in a so-called known Sherby and Down diagram).

The length of the warp yarns in the at least two longitudinal edge sections of the strip of the chain link according to the present invention may be similar or higher than the length of the warp yarns in the core section of the strip. In the latter case, the length L of the warp yarn in the edge sections of the strip may be at least 2% higher than the length L of the warp yarn in the core section of the strip, preferably at least 5%, more preferably at least 10%, yet more preferably at least 15%, yet more preferably at least 20% and most preferably at least 30% and yet most preferably at least 40% higher than the length of the warp yarn in the core section of the strip. The length L of the warp yarn in the edge sections of the strip is preferably at most 50% higher than the length L of the warp yarn in the core section of the strip as higher lengths may determine a very loose and instable chain construction. The core section surface of said strip with length differences is preferably is at least 2%, at least 5%, at least 10%, at least 20% or at least 40% of the total surface of the strip and is preferably at most 50% of the surface of the strip in the chain link according to the present invention. The concentration of the warp yarns may vary as a gradient across the width of the strip, each edge section contains preferably the warp yarns with highest length and the core section contains preferably warp yarns with lowest length. The gradient in increasing warp yarn length from core towards the edge sections may cover 49%, 47.5%, 45%, 40%, 25% on each side of the symmetric constructed strip. Preferably, there is a smooth transition function from the core to the edge sections of the warp yarn length.

The strip may fulfill the equation $0.5 \leq M/E \leq 3$, wherein M is the core section in width of the strip and E is the total of edge sections in the width of the strip, with the total width of the strip consisting of M and E. Preferably, M equals E. Also preferably, E=about ½E1+about ½E2, with E1 being one longitudinal edge section in width and E2 being the other (or the opposite) longitudinal edge section in width. Preferably, the strip may fulfill the equation $0.3 \leq M/E \leq 2$. Preferably, M=E and M/E is about 1.

The width of the strip may vary over a large range, with preferred widths of at least 5 mm, preferably at least 25 mm, more preferably at least 50 mm. The strip may have a width of at most 600 mm, preferably at most 1000 mm. The thickness of the strips is preferably chosen such that the strip has a width to thickness ratio of at least $w/t_{max}$=5:1, more preferably at least $w/t_{max}$=10:1, the width to thickness ratio preferably being at most $w/t_{max}$=100:1, $w/t_{max}$=1000:1, and even more preferably at most $w/t_{max}$=50:1. By limiting the width to thickness ratio of the strips, the links of the chain are more easily accessible for attachment means, such as hooks for instance. Sometimes a strip may as well be called a band or a flat band. Examples of a strip may be a tape, a film or a strap. A strap is readily made for example by weaving, plaiting or knitting yarns into any construction known in the art, e.g. a plain and/or twill weave construction for instance. The strap preferably has an n-ply textile webbing construction where n is preferably at most 4, more preferably 3 and most preferably 2. Such webbing construction has the advantage that it provides the chain link with increased flexibility. The straps can be constructed with different tightness factors to adjust their mechanical properties, and more in particular their elongation to break. Preferred tightness factors are such that the straps have an elongation at break of at most 6%, and more preferred at most 4%. The tightness factor is herein defined as the number of yarns extending parallel to the longitudinal direction of the strap multiplied by the titer of the yarn per unit length.

The chain link according to the present invention may also be referred interchangeable herein to as the "hybrid chain link" or "hybridized chain link" due to presence of more than one type of yarns (e.g. yarns A and B having different minimum creep rate and/or different titers) in the composition of the strip. The chain according to the present invention may also be referred herein interchangeable to as "hybrid chain" or "hybridized chain".

Preferably, the chain link according to the invention has a total weight per unit length of at least 1 g/m. The weight per unit length can be increased by using higher titer and/or more multifilament yarns.

The strip in the chain link according to the present invention may be constructed as already known in the art, e.g. as described in WO2008089798. The strip of material may alternatively form a plurality of convolutions of said strip, the strip having a longitudinal axis and each convolution of said strip comprising a twist along the longitudinal axis of said strip, said twist being an odd multiple of 180 degrees. Such a chain link is described in the published patent application WO2013186206, incorporated herein by reference. By a "convolution" of the strip is herein understood a loop thereof, also called a winding or a coiling, i.e. a length of said strip starting at an arbitrary plane perpendicular to the longitudinal axis of the strip and ending in an endless fashion at the same plane, thereby defining a loop of said strip. The term "plurality of convolutions" may also be understood herein as "coiled into a plurality of overlapping layers". Said overlapping layers of the strip are preferably substantially superimposed upon one another but may also present a lateral offset. The convolutions may be in direct contact to each other but may also be separated. Separation between the convolutions may for example be by a further strip of material, an adhesive layer or a coating. Preferably, the chain link in the chain according to the present invention comprises at least 2 convolutions of the strip of material, preferably at least 3, more preferably at least 4, most preferably at least 8 convolutions. The maximum number of convolutions is not specifically limited. For practical reasons 1000 convolutions may be considered as an upper limit. Each convolution of the strip of material may comprise a twist of an odd multiple of 180 degrees along its longitudinal axis; preferably the odd multiple is one. Said twist of an odd multiple of 180 degrees will result in a chain link comprising a twist of an odd multiple of 180 degrees along its longitudinal axis. The presence of said twist in each convolution of the strip of material results in a chain link with a single outer surface. Another characteristic of said construction may be that the lateral surfaces of a first end of the strip of material are superimposed on either side by the convoluted strip of material. It was observed that said twist results in a construction such that the convolutions lock themselves against relative shifting. Preferably, at least 2 convolutions of the strip of material are connected to each other by at least one fastening means.

The chain link according to the invention can be made by a method comprising the steps of (a) providing a strip comprising a longitudinal core section and at least two longitudinal edge sections, wherein the thickness of the core section is higher than the thickness of the edge sections, (b) optionally twisting a first length of the strip by an odd multiple of 180 degrees about its longitudinal axis, (c) forming a closed loop by joining the length of the strip with a further strip, and (d) superimposing further strip to the closed loop. The strip in step a) may further comprise a warp yarn C as defined herein and may further comprise additional warp yarns D, as defined herein.

The strip in step (a) of the process according to the present invention may be made by any method known in the art, for instance by weaving or knitting the multifilament yarns into any textile construction, known in the art as webbing or narrow weave or woven belt or a plain and/or twill weave construction. The strip having the thickness of the core section higher than the thickness of the edge sections may be produced by using warp yarns having different titers, particularly by a strip comprising warp yarn A and warp yarn B, the titer of warp yarn A being higher than the titer of warp yarn B, wherein the strip comprises a longitudinal core section and at least two longitudinal edge sections, and wherein the concentration of warp yarn A in the core section is higher than the concentration of yarn A in the edge sections of the strip and the concentration of warp yarn B in the edge sections is higher than the concentration of warp yarn B in the core section of the strip. Alternatively, the strip having the thickness of the core section higher than the thickness of the edge sections may be produced by folding a strip having the same or similar thickness of the core section and of the longitudinal edge sections in at least one fold, preferably two folds along its longitudinal axis and preferably then applying stitches to fix the formed construction.

Preferably, the closed loop of step (c) is formed around a pair of rotating wheels and the convolution of the strip of material may be performed while the formed loop is cycling around the pair of wheels. The pair of wheels may be arranged orthogonal to one another. The chain link may be processed by winding and fusing the strip of material. Such a chain link may be manufactured by winding a strip of material for example around a pair of wheels to form a chain link, heating the strip of material to a temperature below the melting point of the strip of material at which temperature the strip of material at least partly fuses, and stretching the chain link by for example increasing the distance between the wheels, while simultaneously rotating the wheels. By increasing the inter-wheel distance, the strip of material is typically drawn.

The present invention also relates to a chain comprising a plurality of interconnected chain links according to the present invention. The chain according to the present invention comprises at least two chain links according to the present invention, which are typically interconnected. By the portion where a chain link interconnects with another chain link or by the portion where (two) adjacent chain links interconnect is herein understood the portion from the circumference of the chain link in direct contact with the other chain link when the chain is under load.

The chain links in the chain according to the present invention may have the same or different inner length, inner width size and thickness. Preferably, all chain links in the chain according to the invention have the same length and thickness as the efficiency of the chain could yet be further improved. The chain according to the invention can have any length. For practical reasons, the chain can have lengths from 0.25 m to 12000 m, preferably at least 1 m; at least 3 m; at least 6 m; at least 10 m; at least 100 m or at least 500 m or at least 1000 m in length. The length of the chain is typically determined by the inner length of its loops times the number of loops linked together. The chain link inner length L can range from about 25 mm to 10 m, preferably 80 mm, preferably 100 mm, preferably 250 mm, preferably 500 mm, preferable 1000 mm, preferable 3000 mm.

The breaking strength of the chain comprising the chain link according to the present invention is preferably at least 23 kN, at least 40 kN, at least 50 kN, at least 100 kN, at least 200 kN, at least 400 kN, at least 500 kN, at least 1000 kN, at least 5000 kN, at least 10000 kN, at least 20.000 kN or at least 50000 kN.

The strength efficiency of the chain's resulting breaking strength with respect to the initial strength of the fiber according to the present invention may be at least 5%, at least 10%, at least 30%, or at least 50%.

The chain link according to the present invention may also comprise a spacer, e.g. a portion of a sleeve. By "spacer" is herein understood a portion of material that is discontinuous from the chain link (i.e. it does not form an integral part of the chain link, e.g. it is additional to the circumference of the link and it may be disconnected from the chain link or connected to said link, e.g. by ways as described herein below like sewing) having an effective thickness Δ between adjacent chain links, at the contact location through which loads are directly transmitted between two adjacent chain links. Such a spacer is already known from the published patent application WO2015/086627. This patent application discloses a chain comprising a spacer having a thickness Δ at the contact location through which loads are directly transmitted between the chain links and a ratio Δ/τ=f, with τ being the thickness of any of the chain links at the location through which loads are transmitted between said chain links and f being in a range between 0.10 and 2.50. By "effective thickness" is understood herein the square root of the cross sectional area of a spacer or of a chain link, respectively in the chain according to the present invention. transmitted between said chain links. The spacer in the chain according to the present invention can comprise any type of material, e.g. metals, preferably light metals and their alloys, e.g. lithium, magnesium and aluminum and Group 4 of the Periodical System of Elements (i.e. metals up to nickel); polymers, such as thermosetting polymers and polymer compositions and/or thermoplastic polymers and polymer compositions; textiles; wood and/or any type of fibers. Preferably, the spacer comprises fiber materials or textile materials. Also preferably, the spacer comprises polymeric fibers, i.e. fibers comprising a polymer or metallic fibers, i.e. fibers comprising a metal. Said polymeric fibers preferably comprise high performance polymeric yarns, as defined herein.

The chain comprising the chain links according to the present invention may also comprise means to attach it to another structure such as a flat bottom on truck, ship, aircraft or train wagon or on a pallet for instance. In this case, pallet attachment fittings, such as double studs, may be connected to the chain. Fittings, and hooks, are generally made from metal, although engineering plastics could alternatively be used. In a preferred embodiment, fittings and hooks are made of light weight metal, preferably magnesium or high strength composite materials, such as carbon fiber epoxy composites. Such light-weight yet strong fittings further contribute to weight reduction of the chain.

The fixation means can be adhesives, preferably liquid adhesives that can be cured after application; stitches and/or splicing. Preferably, the fixation means are stitches, because they can be easily applied in a well-controlled manner, at the desired location. Preferably, stitching is done with a yarn containing high-strength fibers. The liquid adhesive is preferably injected into the connection means, such as an applied knot, and then cured to fixate the connection means. Connections can also be made by locally applying heat and optionally pressure, whereby the multifilament yarns at least partly melt and fuse together. Preferably the end of the chain may be attached to a hook for shortening, which can be from casted iron, steel or lighter metals including titanium, aluminum or magnesium or composite materials, like carbon fiber, epoxy composites. In a preferred similar set-up, one side of the chain will be attached to a tensioner to impose permanent load on the synthetic chain for optimum fixation of cargo respectively freight.

When installed, the chains of the invention are useful and reliable in providing secure anchorage of heavy cargo in extreme conditions, as for example a heavy military aircraft on the pitching deck of a carrier on heavy seas or in cargo aircraft in turbulent air.

The invention also relates to a method to enhance the mechanical properties, in particular the strength of the chain comprising the chain link according to the invention. Namely, it was found that the mechanical properties of said chain, in particular its strength can be improved by pre-stretching the chain prior to its use below the melting point of the polymers in the yarn, more preferably between 70-130° C. or between 80-120° C., and most preferably between 90-110° C.

The chain comprising the chain link according to the invention may be pre-stretched at a temperature below the melting temperature $T_m$ of the polyolefin, by applying a static load of at least 20%, more preferably at least 40%, and most preferably at least 60% of the breaking load of the chain for a period of time long enough to achieve a permanent deformation of the chain of between 2 and 20%, and more preferably between 5 en 10%. By permanent deformation is herein understood the extent of the deformation from which the chain cannot anymore recover. Alternatively, the chain may be pre-stretched as explained hereinabove at room temperature.

The present invention may further direct to a process for increasing the efficiency of a load-bearing component, such as a chain, by applying the chain link according to the present invention.

The present invention also relates to use of the chain according to the present invention for storing, securing, such as securing a roll on/off dumpster to a dumpster hauling truck or freight to commercial trucks, flat bed trailers, lashing and tie down for handling and transporting cargo, in lifting and hoisting, logging, hauling and rigging, propulsion and driving, mooring, cargo-hold of an aircraft or naval ship and the like. For instance the chain may be subjected to a number of load cycles. Preferably, the number of cycles ranges from 2-25, more preferably from 5-15, and most preferably from 8-12, whereby the maximum load applied is lower than 60% or lower than 45% of the breaking load of the chain, more preferably lower than 35% of the breaking load of the chain, and most preferably lower than 25% of the breaking load of the chain. It is possible according to the invention to unload the chain during load cycling. In a preferred method however, the minimum load applied is at least 1%. The chain according to the invention is resistant to cyclic loading.

The invention may also direct to a chain link comprising a strip comprising a longitudinal core section and at least two longitudinal edge sections, the thickness of the core section being higher than the thickness of the edge section, wherein the strip is a tape. Preferably, the invention relates to a chain link comprising a strip containing warp yarns comprising warp yarn A and warp yarn B, the titer of warp yarn A being higher than the titer of warp yarn B, wherein the strip comprises a longitudinal core section and at least two longitudinal edge sections, and wherein the concentration of warp yarn A in the core section is higher than the concentration of yarn A in the edge sections of the strip and the concentration of warp yarn B in the edge sections is higher than the concentration of warp yarn B in the core section of the strip and wherein the strip is a tape. Such tapes are also known as "fibrous tape" or as a "solid state tape" and can be produced by any method known in the art. For instance, said fibrous tapes may be produced by a gel spinning process, i.e. the tapes comprise gel spun UHMWPE fibers. The drawing, preferably uniaxial drawing, of the produced tape may be carried out by means known in the art. Such means comprise extrusion stretching and tensile stretching on suitable drawing units. Another preferred method for the preparation of said tapes comprises mechanical fusing of unidirectional oriented fibers under a combination of pressure, temperature and time. Such a tape and a method to prepare such a tape are described in EP2205928, which is incorporated herein by reference. For the production of said solid state tapes, a process that takes place in solid state is typically used, which may comprise feeding UHMWPE powder between a combination of endless belts, compression-moulding the polymeric powder at a temperature below the melting point thereof and rolling the resultant compression-moulded polymer followed by drawing. Such a method is for instance described in U.S. Pat. Nos. 5,091,133 and 7,993,715, which are incorporated herein by reference.

The invention may also direct to a chain link comprising a strip comprising tape A and tape B, the titer of tape A being higher than the titer of tape B, wherein the strip comprises a longitudinal core section and at least two longitudinal edge sections, and wherein the concentration of tape A in the core section is higher than the concentration of tape A in the edge sections of the strip and the concentration of tape B in the edge sections is higher than the concentration of tape B in the core section of the strip and wherein the strip is a tape. Such tapes are also known as "solid state tape" and can be produced by any method known in the art. A preferred method for the production of said tapes is a process that takes place in solid state, which comprises feeding UHMWPE powder between a combination of endless belts, compression-moulding the polymeric powder at a temperature below the melting point thereof and rolling the resultant compression-moulded polymer followed by drawing. Such a method is for instance described in U.S. Pat. Nos. 5,091,133 and 7,993,715, which are incorporated herein by reference.

Furthermore, the present invention also directs to a strip comprising a longitudinal core section and at least two longitudinal edge sections, the thickness of the core section being higher than the thickness of the edge sections. Preferably, said strip comprises warp yarns containing warp yarn A and warp yarn B, wherein the titer of warp yarn A is higher than the titer of warp yarn B and the concentration of warp yarn A in the core section is higher than the concentration of yarn A in the edge sections of the strip and the concentration of warp yarn B in the edge sections is higher than the concentration of warp yarn B in the core section of the strip. The strip may be a tape, preferably a fibrous tape as described herein above.

The invention also directs to a strip comprising tape A and tape B, the titer of tape A being higher than the titer of tape B, wherein the strip comprises a longitudinal core section and at least two longitudinal edge sections, and wherein the concentration of tape A in the core section is higher than the concentration of tape A in the edge sections of the strip and the concentration of tape B in the edge sections is higher than the concentration of tape B in the core section of the strip and wherein the strip is a tape. Said tapes are preferably solid state tapes, as described herein above.

It is noted that the invention relates to all possible combinations of features recited in the claims. Features described in the description may further be combined.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention will be further elucidated with the following examples without being limited hereto.

EXAMPLES

Materials and Methods

Intrinsic Viscosity (IV) is determined according to ASTM-D1601/2004 at 135° C. in decalin, the dissolution time being 16 hours, with DBPC as anti-oxidant in an amount of 2 g/l solution, by extrapolating the viscosity as measured at different concentrations to zero concentration. There are several empirical relations between IV and Mw, but such relation is highly dependent on molar mass distribution. Based on the equation $M_w = 5.37 \times 10^4 [IV]^{1.37}$ (see EP 0504954A1) an IV of 4.5 dl/g would be equivalent to a $M_w$ of about 422 kg/mol.

Titer of yarn or filament was measured by weighing 100 meters of yarn or filament, respectively. The dtex of the yarn or filament was calculated by dividing the weight (expressed in milligrams) to 10. Alternatively, 10 meters is weighed and dtex is the number of milligram of the yarn length. tex=g/km; dtex=grams/10 km or mg/10 m. The higher the number of dtex, the thicker the yarn.

Side chains in UHMWPE sample is determined by FTIR on a 2 mm thick compression molded film by quantifying the absorption at 1375 cm$^{-1}$ using a calibration curve based on NMR measurements (as in e.g. EP 0 269 151).

Tensile properties: tensile strength (or strength) and tensile modulus (or modulus) are defined and determined on multifilament yarns as specified in ASTM D885M, using a nominal gauge length of the fibre of 500 mm, a crosshead speed of 50%/min and Instron 2714 clamps, of type "Fibre Grip D5618C". On the basis of the measured stress-strain curve, the modulus is determined as the gradient between 0.3 and 1% strain. For calculation of the modulus and strength, the tensile forces measured are divided by the titer, as determined by weighing 10 metres of fibre; values in GPa are calculated assuming a density of 0.97 g/cm$^3$.

Tenacity (cN/dtex or N/tex; 10 cN/dtex=1 N/tex) of a chain is determined by dividing the breaking strength of the chain by the weight of a unit length of the chain. Weight was corrected by reducing it by the weight of the non-load bearing weft yarns.

Breaking strength and elongation at break of a chain are determined on dry chain samples using a Zwick 1484 Universal test machine at a temperature of approximately 21 degree C., and at a strain rate of 0.1/min.

Efficiency (%) of a chain is the original tenacity of the chain divided by the tenacity of the load bearing warp yarns (i.e. the tenacity of the ingredient fibers Dyneema® SK75 and SK78 was 35 cN/dtex). In case Dyneema® DM20 was used, than a weighted tenacity was used, which was 32 cN/dtex resulted from the number of warp yarns (pitches) per fiber grade used in warp direction. The dead weight and the tenacity of the non-load bearing weft yarns were ignored.

The maximum breaking load (MBL) is the force necessary to completely rupture a dry sample of a chain, comprising at least three, preferably five chain links.

Tensile testing (to measure MBL) of the chain was performed on dry chain samples, comprising at least three, preferably five chain links, using a break load tester 1000 kN Horizontal bench fa. ASTEA (Sittard, The Netherlands) testing machine, at a temperature of about 16° C., a speed of 20 mm/min. Maximum clamp length was 1.2 m and the pin diameter was 150 mm.

The chains were tested using D-shackles, the ratio between the diameter of the shackle and the thickness of the tested article connected to them was 5. The D-shackles were arranged in a parallel configuration for the rope.

Minimum creep rate of the yarns was determined as indicated in the present patent application and in the published patent application WO2016/001158. The minimum creep rate of the warp yarns have been derived herein from a creep measurement applied on multifilament yarns by applying ASTM D885M standard method under a constant load of 900 MPa, at a temperature of 30° C. and then measuring the creep response (i.e. strain elongation, %) as a function of time. The minimum creep rate is herein determined by the first derivative of creep as function of time, at which this first derivative has the lowest value (e.g. the creep rate [1/s] of the yarn is plotted as function of strain elongation [%] of the yarn in a so-called known Sherby and Down diagram.

Comparative Experiment 1 (CE1)

An 8 layer chain link was wound from a narrow weave strip made of Dyneema® SK75 yarns in warp direction, having a strip width of 25 mm, a thickness of 1.5 mm and a length of 400 mm. The strip was commercially available from Güth & Wolf GmbH (silver grey 1" weave) with a nominal breaking strength of 5 tons (49 kN) and a leg weight of 44 g/m. The warp yarns in the strip were made of 120 Dyneema® SK75 yarns each having a titer of 1760 dtex, a twist rate of 25 turns per meter (Z25) and 35 cN/dtex initial specific yarn strength and a minimum creep rate of $2.4 \times 10^{-5}$% per second measured at a tension of 900 MPa and a temperature of 30° C.

The yarns in weft direction were made of Dyneema® SK60 yarns having a titer of 880 dtex with a twist of 40 turns per meter (Z40) and having a minimum creep rate of $5.8 \times 10^{-5}$% per second measured at a tension of 900 MPa and a temperature of 30° C. and a twist rate of 40 turns per meter (Z40). The ratio of the total weight of the weft yarns to the total weight of the warp yarns was 20:80. The strip (or webbing) was then heat set and pre-stretched at about 120° C. for 2 min and 10% maximum break load (equal to 4.9 kN) and then dip coated in a water dispersed silver colored resin (commercially available from CHT Beitlich GmbH (D), trade name TUBICOAT FIX ICB CONC.) and subsequently dried by hot air stream. The final strip had MBL of 49 kN or 5 metric tons.

A length of the strip was tightly convoluted in 8 layers to form a 0-shape link (loop) of 100 mm inner length bearing a 180 degree twist in each convolution of the strip. A total of 8 convolutions were performed with approximately 2.5 m of the strip. The so formed 180 degree twisted link had approximate circumferences of 100 mm (inner) and 134 mm (outer) and the thickness of the 8 layers links was 12 mm. The 2 ends of the sling overlapped by approximately 110 mm and were stitched together through the thickness of the 180 degrees twisted link over a length of 110 mm with an MW stitching pattern (zig-zag) with XtremeTech™ 20/40 (Amann & Co GmbH, Germany) sewing threat, made from Dyneema® SK75 with a titer of 440 dtex.

A chain was then made by interconnecting five chain links, obtained as described herein above. The total length of this five link chain was 0.6 meter corresponding to a titer of 25660 tex.

Heat-Setting Step

The obtained chain was then pre-stretched five times up to 50% MBL, corresponding to 100 kN for 1 min, at a temperature of 120° C.

Four chain samples, each of them consisting of five chain links were produced as described herein (CE1, CE2, Ex. 1-2). The chains were produced without applying the heat-setting step (sample denoted with "a" in Table 1) and with applying the heat-setting step (sample denoted with "b" in Table 1).

The results are presented in Table 1.

Comparative Experiment 2 (CE2)

Comparative Experiment 2 was performed by repeating Comparative Experiment 1, but with the difference that the warp yarn was made of 120 Dyneema® DM20 yarns each having a titer of 1760 dtex, a twist of 25 turns per meter (Z25) and a 32 cN/dtex initial specific yarn strength and a minimum creep rate of $1.3 \times 10^{-6}$% per second measured at a tension of 900 MPa and a temperature of 30° C.

The results are presented in Table 1.

Example 1 (Ex.1)

Example 1 was performed by repeating Comparative Experiment 1, but with the following differences:

The warp yarns in the strip were made of yarns having different titers and similar minimum creep rate values, namely [C1]+[B1]+[A]+[B2]+[C2]=[15 Dyneema® SK60 yarns having a titer of 880 dtex and Z40 (yarn C1, located in one longitudinal edge section) and a minimum creep rate of $5.8 \times 10^{-5}$% per second measured at a tension of 900 MPa and a temperature of 30° C.]+[20 Dyneema® SK78 yarns having a titer of 1760 dtex and Z25 and a minimum creep rate of $1.3 \times 10^{-5}$% per second measured at a tension of 900 MPa and a temperature of 30° C. (yarn B1, located in the same longitudinal edge section together with yarn C1)]+[30 Dyneema® SK78 yarns having a titer of 2640 dtex and Z25 and a minimum creep rate of $1.3 \times 10^{-5}$% per second measured at a tension of 900 MPa and a temperature of 30° C. (yarn A, located in the core section)]+[20 Dyneema® SK78 yarns having a titre of 1760 dtex and Z25 and a minimum creep rate of $1.3 \times 10^{-5}$% per second measured at a tension of 900 MPa and a temperature of 30° C. (yarn B2, located in the opposite longitudinal edge section)]+[15 Dyneema® SK60 yarns having a titer of 880 dtex and Z40 and a minimum creep rate of $5.8 \times 10^{-5}$% per second measured at a tension of 900 MPa and a temperature of 30° C. (yarn C2, located in the opposite longitudinal edge section together with yarn B2)]. (B=B1+B2; C=C1+C2)

Thus, the total of warp yarns [C]+[B]+[A]=[30 Dyneema® SK60 yarns having a titer of 880 dtex and Z40 and a minimum creep rate of $5.8 \times 10^{-5}$% per second measured at a tension of 900 MPa and a temperature of 30° C. (yarn C)]+[40 Dyneema® SK78 yarns having a titer of 1760 dtex and Z25 and a minimum creep rate of $1.3 \times 10^{-5}$% per second measured at a tension of 900 MPa and a temperature of 30° C. (yarn B)]+[30 Dyneema® SK78 yarns having a titer of 2640 dtex and Z25 and a minimum creep rate of $1.3 \times 10^{-5}$% per second measured at a tension of 900 MPa and a temperature of 30° C. (yarn A)], resulting in an amount of warp yarns per titer (i.e. amount of warp yarns or pitches per titer in the warp system) of 15 wt % yarn C, 40 wt % yarn B and 45 wt % yarn A.

The results are presented in Table 1.

Example 2 (Ex. 2)

Example 2 was performed by repeating Example 1, but with the following differences:

The warp yarns comprise Dyneema® SK99 yarns having a 42.5 cN/dtex initial specific yarn strength and a minimum creep rate of $7 \times 10^{-6}\%$ per second measured at a tension of 900 MPa and a temperature of 30° C. and Dyneema® DM20 yarns having a 32 cN/dtex initial specific yarn strength and a minimum creep rate of $1.3 \times 10^{-6}\%$ per second measured at a tension of 900 MPa and a temperature of 30° C.

The warp yarns in the strip were made of yarns having different titers and different minimum creep rate values, comprising [C1]+[B1]+[A]+[B1]+[C2]=[20 Dyneema® SK99 yarns having a titer of 880 dtex and Z25 and a minimum creep rate of $7 \times 10^{-6}\%$ per second measured at a tension of 900 MPa and a temperature of 30° C. (yarn C1, located in one outmost longitudinal edge section)]+[30 Dyneema® DM20 yarns having a titer of 1760 dtex and a minimum creep rate of $1.3 \times 10^{-6}\%$ per second measured at a tension of 900 MPa and a temperature of 30° C. (yarn B1, located in one longitudinal edge section together with yarn C1)]+[20 Dyneema® DM20 yarns having a titer of 2×1760 dtex, thus about 3520 dtex and Z25 and a minimum creep rate of $1.3 \times 10^{-6}\%$ per second measured at a tension of 900 MPa and a temperature of 30° C. (yarn A, located in the core section)]+[30 Dyneema® DM20 yarns having a titer of 1760 dtex and Z25 and a minimum creep rate of $1.3 \times 10^{-6}\%$ per second measured at a tension of 900 MPa and a temperature of 30° C. (yarn B2, located in the opposite longitudinal edge section)]+[20 Dyneema® SK99 yarns having a titer of 880 dtex and Z25 and a minimum creep rate of $7 \times 10^{-6}\%$ per second measured at a tension of 900 MPa and a temperature of 30° C. (yarn C2, located in one outmost longitudinal edge section together with yarn B2)]. (C1+C2=C; B1+B2=B)

The concentrations with regard to the number of warp yarns (pitches) per titre was [C]:[B]:[A]=16.6%:33%:50% and with regard to weight % of the warp yarns in the warp system: [C]:[B]:[A]=16.6 wt %:33 wt %:50 wt %.

In Examples 1-2, the strip construction has a M/E ratio of about 1, wherein M is the core section in width of the strip and E is the total of the two longitudinal edge sections in the width of the strip, with the total width of the strip consisting of M and E, with M equals E and E=about ½E1+about ½E2, with E1 being one longitudinal edge section in width and E2 being the other (or the opposite) longitudinal edge section in width.

The results are presented in Table 1.

The results shown in Table 1 demonstrate that the chains according to the present inventions (chains of Examples 1) have an increase of the breaking strength and efficiency compared to the chains obtained in CE1 and CE2. Namely, an improved chain efficiency was achieved by chain links wound from an elliptic strip profile (chain link comprising a strip made of warp yarns having different titers, Example 1). Before applying a heat setting step, the chain of Example 1a achieved more than 13% efficiency and after heat setting, said chain achieved 31% efficiency (Example 1 b). By applying thus the elliptical strip profile, an optimum saddle profile between chain adjacent links minimized loss in chain efficiency. In addition, it was observed a significant increase of the tenacity value and respectively about 50% reduction of efficiency loss for the chains that were heat set compared to the chains that were not heat set. In addition, a significant reduction of the efficiency losses in the chain interface was achieved in case the strip was hybridized (i.e. either by different creeping warp yarns and/or by different titers in the warp yarns forming an elliptical strip cross-section).

TABLE 1

| Sample | Strip Cross-Section | Th. yarn Ten. cN/dtex | Strip wt. g/m | Strip MBL kN | Strip Ten. cN/dtex | Chain wt. g/m | Chain MBL kN | Chain Ten. cN/dtex | Loss in chain Ten. vs. strip Ten. cN/dtex | Chain Eff. % |
|---|---|---|---|---|---|---|---|---|---|---|
| CE1a | R | 35 | 25.66 | 50717 | 19.7 | 666.5 | 22.6 | 3.73 | −15.97 | 10.6 |
| CE1 b | R | 35 | 25.66 | 50717 | 19.7 | 666.5 | 27.8 | 7.06 | −12.64 | 20.2 |
| CE2a | R | 32 | 26.13 | 43163 | 16.5 | 654.6 | 21.7 | 3.39 | −13.11 | 10.4 |
| CE2b | R | 32 | 26.13 | 43163 | 16.5 | 654.6 | 29.1 | 8.12 | −8.38 | 25.4 |
| Ex. 1a | E | 33.8 | 22.35 | 29518 | 13.2 | 583.9 | 16.6 | 4.64 | −8.56 | 13.7 |
| Ex. 1b | E | 33.8 | 22.35 | 29518 | 13.2 | 583.9 | 29.5 | 10.47 | −2.73 | 31 |
| Ex. 2a | E | | | | | | | | | |
| Ex. 2b | E | | | | | | | | | | a = chain sample which was not heat-set;
b = chain sample which was heat-set; ;
R = Rectangular;
E = Elliptic;
wt. = weight;
Th. = Theoretical;
Eff. = Efficiency;
Ten. = Tenacity

The invention claimed is:

1. A chain link comprising a strip, wherein
   the strip includes a longitudinal core section and at least two longitudinal edge sections, and wherein
   the core section has a thickness which is greater than a thickness of the at least two edge sections, and wherein
   the strip comprises warp yarns containing warp yarn A and warp yarn B, wherein the warp yarn A has a titer which is greater than a titer of the warp yarn B, and wherein
   the warp yarn A is present in the core section at a concentration which is greater than a concentration of the warp yarn A in the edge sections of the strip, and wherein
   the warp yarn B is present in the edge sections at a concentration which is greater than the concentration of the warp yarn B in the core section of the strip.

2. The chain link according to claim 1, further comprising a warp yarn C, wherein
the titer of the warp yarn A is greater than the titer of warp yarn B, and wherein
the titer of the warp yarn B is greater than a titer of the warp yarn C, and wherein
the warp yarns B and C are present in the edge sections at a concentration which is greater than a concentration of the warp yarns B and C in the core section of the strip.

3. The chain link according to claim 2, wherein the concentration of the warp yarn C in the longitudinal edge sections is less than the concentration of the warp yarn B in the longitudinal edge sections.

4. The chain link of claim 2, wherein warp yarn C is located at outmost regions of the at least two longitudinal edge sections of the strip.

5. The chain link of claim 2, wherein, the titer of warp yarn C is in the range of from 500 dtex to 7500 dtex.

6. The chain link of claim 5, wherein, the titer of warp yarn C is in the range between 800 dtex and 2000 dtex.

7. The chain link according to claim 1, wherein the warp yarns comprise a high performance polymeric yarn.

8. The chain link according to claim 7, wherein the high performance polymeric yarn is a high performance polyolefin yarn.

9. The chain link according to claim 8, wherein the high performance polymeric yarn is an ultrahigh molecular weight polyethylene (UHMWPE) yarn.

10. The chain link of claim 1, wherein the concentration of the warp yarn A in the core section is in a range of 50 wt % to 100 wt %, based on the total warp yarn weight of the core section.

11. The chain link of claim 1, wherein the concentration of the warp yarn A in each of the longitudinal edge sections is in a range of 0 wt % to 100 wt %, based on the total warp yarn weight of each longitudinal edge section.

12. The chain link according to claim 1, wherein the strip has a longitudinal axis and forms a plurality of convolutions, wherein each convolution of the strip comprising a twist along the longitudinal axis of the strip, the twist being an odd multiple of 180 degrees.

13. The chain link of claim 12, wherein the chain link comprises at least 4 convolutions.

14. The chain link of claim 1, wherein the warp yarns have different minimum creep rates, measured at a tension of 900 MPa and a temperature of 30° C.

15. The chain link of claim 14, wherein the warp yarns A and B have different minimum creep rates, measured at a tension of 900 MPa and a temperature of 30° C.

16. The chain link of claim 1, wherein the warp yarns in the at least two longitudinal edge sections have a length which is greater than a length of the warp yarn in the core section of the strip.

17. The chain link according to claim 1, wherein the strip is a woven structure.

18. The chain link of claim 1, wherein the titer of the warp yarn A is in the range of from 2000 dtex to 5000 dtex.

19. The chain link according to claim 18, wherein the titer of the warp yarn A is in the range in the range of from 2000 dtex to 3000 dtex.

20. The chain link of claim 1, wherein the titer of the warp yarn B is in the range of from 700 dtex to 7500 dtex.

21. The chain link of claim 20, wherein the titer of the warp yarn B is in the range between 800 dtex and 3000 dtex.

22. The chain link of claim 1, wherein the strip in the chain link has a substantially elliptic cross-section.

23. A chain comprising a plurality of chain links, wherein at least one of the chain links is the chain link according to claim 1.

24. A chain comprising at least two interconnected chain links, wherein each of the interconnected chain links is the chain link according to claim 1.

25. A method for enhancing the strength of a chain which comprises:
(a) providing the chain according to claim 24, and
(b) pre-stretching the chain before use at a temperature below a melting temperature of the yarns.

26. A strip comprising:
a longitudinal core section, and
longitudinal edge sections, wherein
the core section has a thickness which is greater than a thickness of the edge sections, wherein
the strip comprises warp yarns containing warp yarn A and warp yarn B, wherein
the warp yarn A has a titer which is greater than a titer of the warp yarn B, and wherein
the warp yarn A is present in the core section at a concentration which is greater than a concentration of the warp yarn A in the edge sections of the strip, and wherein
the warp yarn B is present in the edge sections at a concentration which is greater than a concentration of the warp yarn B in the core section of the strip.

27. A method of manufacturing a chain link comprising winding and fusing the strip of claim 26.

* * * * *